A. ALLERTON.
Sheep Rack.

No. 45,011. Patented Nov. 15, 1864.

Witnesses:

Inventor:
Amos Allerton

UNITED STATES PATENT OFFICE.

AMOS ALLERTON, OF AZTALAN, WISCONSIN.

IMPROVEMENT IN SHEEP-RACKS.

Specification forming part of Letters Patent No. 45,011, dated November 15, 1864.

*To all whom it may concern:*

Be it known that I, AMOS ALLERTON, of Aztalan, in the county of Jefferson and State of Wisconsin, have invented certain new and useful Improvements in Sheep-Racks; and I do hereby declare that the following is a full and complete description of the construction and operation of the same, reference being had to the accompanying drawings, making a part of this specification, in which—

Figure 1:
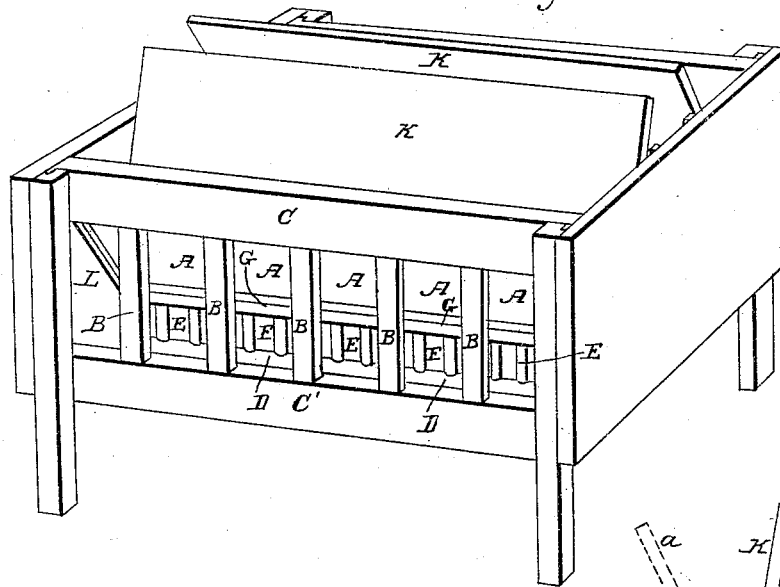
Figure 3:
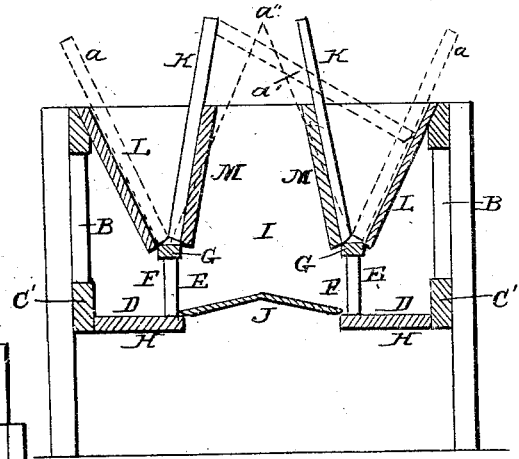
Figure 2:
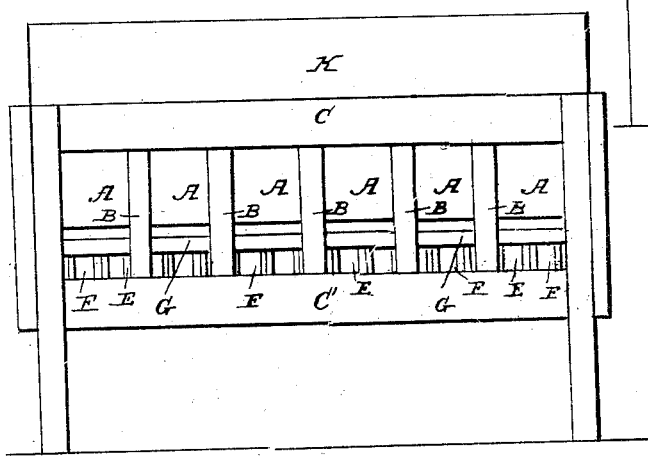

Figure 1 is a perspective view. Fig. 2 is a side view. Fig. 3 is a transverse section.

Like letters of reference denote like parts in the several views.

The nature of my improvement relates to a rack so constructed that the sheep may be fed either grain or hay, or both at the same time, and to prevent the same from being wasted, and is protected from the storm, and the feeble animals most liable to be driven from the rack by the stronger sheep. The general form of the rack is seen in Fig. 1, which may be rectangular, oblong, or any other desirable form and size, as the case may require, and is supported by four legs.

The rack is closed at the ends and open at the sides, which sides form openings A and bars B, united to the stringers C C' above and below, the stringers being connected to the ends and legs of the rack. The spaces A, Figs. 1 and 2, admit the animal's head only, so that it may eat the grain from the trough D, Figs. 1 and 3. The bars B and stringers C C' form guards, which prevent wasting of the feed and from being trampled upon, and the weak animals are not as easily driven from the rack by the stronger ones.

Directly inside of the guards and grain-troughs are arranged the racks E E, which consist of the uprights or bars F and stringers G, which are formed together and to the bottom board, H, and the ends of the rack. On the inside or interior is the hay-crib I, with the inclined floors J, Fig. 3, which extend the whole length of the rack. Directly over the crib are arranged two covers or doors, K K, which rest upon the stringers G without being hinged or jointed together. These doors may be turned back, as indicated at $a$, so as to rest against cleats L, which are attached to each end of the rack, that renders it very convenient for putting hay into the crib. When the weather is fair, the doors or covers may rest against cleats M M, and in case of storms one of the doors may be raised and turned, as shown by the dotted line $a'$, which forms a roof over the crib, protecting the hay from injury.

If preferred, the doors at the top may be brought in close contact with the base resting upon the stringers, as indicated at $a''$, which will form an angular roof over the crib for protection.

By the inclination of the floor J all the hay in the crib will readily move to the rack, so as to be taken up by the sheep, and all waste hay from the crib will be gathered in the grain-troughs as the hay is taken from the racks F F by the sheep and ate in the grain-troughs, in which the animals cannot get their feet, and very little hay by this means is dropped upon the ground while the animals are feeding.

What I claim as my improvement, and desire to secure by Letters Patent, is—

The special construction and arrangement of the adjustable doors or covers K K, crib I, with the inclined floor J, in combination with the racks E E, grain-troughs D D, and guards, when used conjointly, so that the grain-troughs are between the guards and racks with the hay-crib inside, as and for the purpose set forth.

AMOS ALLERTON.

Witnesses:
W. H. BURRIDGE,
A. W. MCCLELLAND.